United States Patent [19]

Komeya et al.

[11] 3,969,125

[45] July 13, 1976

[54] HEAT RESISTIVE AND REINFORCED COMPOSITE MATERIAL

[75] Inventors: Katsutoshi Komeya, Kawasaki; Hiroshi Inoue, Kawaguchi; Akihiko Tsuge, Yokohama, all of Japan

[73] Assignee: Tokyo Shibaura Electric Co., Ltd., Kawasaki, Japan

[22] Filed: July 23, 1973

[21] Appl. No.: 381,672

Related U.S. Application Data

[63] Continuation-in-part of Ser. No. 169,821, Aug. 6, 1971, abandoned.

[30] Foreign Application Priority Data

Aug. 10, 1970 Japan................................ 45-69308

[52] U.S. Cl............................... 106/73.2; 106/73.5; 264/63; 264/66; 264/332
[51] Int. Cl.² ......................................... C04B 35/50
[58] Field of Search....................... 264/63, 66, 332; 106/65, 73.2, 73.5

[56] References Cited
UNITED STATES PATENTS 3,262,761   7/1966   Bechtold............................... 106/65
3,549,402   12/1970   Whitney................................ 264/65

OTHER PUBLICATIONS

Mazdiyasni et al., "Consolidation, Microstructure, and Mechanical Properties of $Si_3N_4$ Doped with Rare-Earth Oxides," J. Am. Cu. Soc., 57[12], pp. 536–537, (Dec. 1974).

*Primary Examiner*—Donald J. Arnold
*Assistant Examiner*—John Parrish
*Attorney, Agent, or Firm*—Kemon, Palmer & Estabrook

[57] ABSTRACT

We had previously disclosed a heat resistive and reinforced composite material which was prepared by sintering a finely powdered mixture of trisilicon tetranitride and an oxide of yttrium group elements.

More improved similar composite material having excellent bending strength can be obtained by sintering a finely powdered mixture of trisilicon tetranitride, yttrium oxide and aluminum oxide. Cerium oxide, lanthanum oxide or scandium oxide can also be used instead of yttrium oxide.

19 Claims, No Drawings

HEAT RESISTIVE AND REINFORCED COMPOSITE MATERIAL

CROSS-REFERENCE TO RELATED APPLICATION

This invention is a continuation-in-part of our co-pending patent application Ser. No. 169,821 filed Aug. 6, 1971, now abandoned, and assigned to the same assignee as the present invention.

This invention relates to a heat resistive and reinforced articles, and more particularly to a heat resistive and reinforced articles made of composite material prepared by sintering mixed and molded raw materials containing the major component if trisilicon tetranitride.

It is already known that a sintered material consisting of trisilicon tetranitride ($Si_3N_4$) has many superior characteristics, such as high heat resistivity to temperatures up to 1900°C, good mechanical strength at high temperatures, low thermal expansion coefficient, and a resultant high resistivity to heat shocks. It is now being developed to utilize this material as a substitute of cermet for machine parts which require good heat resistivity and mechanical strength at high temperatures. Further, this material is now utilized for making molten metal vessels because of its excellent corrosion resistivity to molten metals.

The densification property of trisilicon tetranitride sintered under atmospheric pressure is very inferior. Therefore, it must be sintered under high pressure when a product of high density and good strength is desired. However, such pressurized sintering is not practical because of its troublesome operation.

A modified method of sintering under atmospheric pressure is known to replace the hot-press sintering of trisilicon tetranitride. In this modified method, a press-molded silicon powder, which may be more or less densely formed, is sintered under atmospheric pressure in an atmosphere of nitrogen which reacts with the silicon. The density of the sintered trisilicon tetranitride, however, is no more than 85 percent of the theoretical value, and no sintered article of greatly high density can be obtained.

An object of this invention is to obtain a heat resistive and reinforced article made of composite materials having high density and good bending strength by ordinary sintering.

The above object can be attained in accordance with the present invention by press-molding a finely powdered mixture of trisilicon tetranitride, an oxide of yttrium group elements and aluminum oxide, and sintering said press-molded article under atmospheric pressure.

The features of the invention which are believed to be novel are set forth with particularity in the appended claims. The invention itself, however, as to its organization may best be understood by reference to the following description.

The heat resistive and reinforced article made of composite materials in accordance with this invention is prepared by sintering under atmospheric pressure a press-molded mixture of finely powdered raw materials of trisilicon tetranitride, an oxide of yttrium, scandium, lanthanum or cerium and aluminum oxide.

In the sintering process of this invention, a chemical compound of Si-Y-Al-O-N series is formed on the basis of the mutual reaction between trisilicon tetranitride, an oxide of the afore-mentioned yttrium, scandium, lanthanum or cerium or a mixture thereof and aluminum oxide, and the sintered substance mainly contains trisilicon tetranitride and a small amount of above-mentioned chemical compound. The microscopic structure of this sintered substance is fibrous, needle-like or columnar (hereinafter referred to merely as "fibrous").

The preferable range of mixing ratio of the three kinds of raw material is 70 to 90 weight percent of trisilicon tetranitride, 5 to 20 weight percent of an oxide of yttrium, scandium, lanthanum or cerium or any of mixtures thereof, and 1 to 20 weight percent of aluminum oxide, based respectively on the weight of mixed raw materials. Mixing outside this range will result in no favorable composite materials. In addition, about 5 weight percent, based on the weight of mixed raw materials, of a binding material such as stearic acid may be added to the mixed raw materials to form a molded article to be sintered. This binder will vaporize and disappear from the article when heated during the sintering process.

The particle size of each raw material should preferably be from 0.1 to 2.0 microns.

The preferable sintering temperature is from 1400° to 1900 °C. At a temperature lower than 1400 °C, there is scarcely recognized a progress of sintering, and at a temperature of over 1900 °C, a decomposition of the fibrous structure depending on the sublimation of trisilicon tetranitride occurs actively, so that in these cases a favorable sintered composite material can not be obtained.

Sintering should preferably be carried out in a non-oxidizing atmosphere. The presence of a large amount of oxygen will oxidize trisilicon tetranitride at a high temperature and change it into silicon dioxide, so that the inherent nature of the material will be lost. The presence in the atmosphere of oxygen in the amount less than 10 volume percent will not function to change the nature of the sintered substance since only a small part of trisilicon tetranitride changes into harmless silicon oxynitride ($Si_2ON_2$), with the result that the sintered substance can be utilized for any purpose without practical disadvantages.

It is one feature of this invention to employ a method of ordinary sintering, that is, sintering at atmospheric pressure, and also a method of pressurized sintering. In the latter case, the structure and characteristics of the product may differ from one obtained in the former case to some extent. That is to say, though the products by both methods have a fibrous structure respectively, the method of atmospheric pressure sintering produces a fibrous structure arranged in three dimensional directions, while the method of pressurized sintering brings on two dimensional directions parallel to the pressing plane. Therefore, it is necessary to select either one of the methods in compliance with a particular application of the product.

As a substitute of trisilicon tetranitride, silicon or a mixture of silicon and trisilicon tetranitride may be used. In these cases, it is necessary to sinter the mixed raw material in a nitrogenous atmosphere, formed for example of ammonia gas or a mixed gas of nitrogen and hydrogen, in order to change the silicon into trisilicon tetranitride during sintering.

As a substitute of yttrium oxide, yttrium carbonate [$Y_2(CO_3)_3$] or yttrium hydroxide ($Y(OH)_3$) may be used by reason of the fact that such substitutes are changed by heating into $Y_2O_3$ during sintering. By the same reason $Al_2(SO_4)_3$ may be used as a substitute of $Al_2O_3$.

Yttrium oxide can be entirely or partly replaced by scandium oxide, lanthanum oxide or cerium oxide, with substantially the same results.

A suitable heat resistive substance such as any of the oxides, nitrides, carbides, silicides, sulfides or boron compounds may be included into the raw materials in order to add its specific character thereto.

The invention will be more clearly understood from the following examples, given by way of illustration and not limitation. All parts are by weight.

EXAMPLE 1

A mixture consisting of 80 parts of trisilicon tetranitride, 10 parts of yttrium oxide, 10 parts of aluminum oxide, the mean particle sizes thereof being 1.5, 1.6 and 1.1 microns respectively, and 5 parts of stearic acid as a binder was press-molded into small rods, the size thereof being 8 mm$\phi$ × 15 mm, under a pressure of 5000 kg/cm². These rods were filled into a muffle, using aluminum nitride powder as a filler, and heated by the following rates of temperature rise in nitrogen gas atmosphere which was prepared by passing the gas through the muffle at a rate of 800 l per hour.

Room temperature to 400 °C . . . . for 4 hours, and
400 °C to 1600 °C . . . . for 1 hour.

After sintering for 2 hours at 1600 °C under atmospheric pressure, the sintered substance was permitted to be self-cooled.

The density of the obtained article was 3.40 g/cc. For reference, the theoretical density of $Si_3N_4$, $Y_2O_3$ and $Al_2O_3$ are 3.20 g/cc, 4.8 g/cc and 3.9 g/cc respectively. The mechanical bending strength of the obtained article was 45.7 kg/mm².

In comparison with the density and bending strength of similarly sintered simple trisilicon tetranitride, those were 2.4 g/cc and 2 kg/mm² respectively.

The obtained composite material had a three dimensional fibrous structure under microscopic observation. In this structure, the fibrous crystals consisted of $Si_3N_4$, and the matrix thereof was made of Si-Y-Al-O-N compounds.

EXAMPLES 2 TO 11

Raw materials of trisilicon tetranitride, yttrium oxide or its substitute and aluminum oxide, together with 5 parts of stearic acid as a binder, were mixed in various proportions as shown in Table 1. Each mixture was shaped and heated up similarly to Example 1 in argon gas atmosphere, and thereafter sintered under the condition as shown in Table 1 respectively in the same atmosphere. The bending strength of each sintered substance is shown in Table 1. All sintered substances had a three dimensional fibrous structure.

Comparatively, when $Al_2O_3$ was not used in the process of Example 2, the bending strength of the sintered substance obtained was 32.0 kg/mm².

Table 1

| No. of Ex. | Proportion of raw materials (wt. % based on the weight of mixed raw materials) | | | Condition of sintering Temp. (°C) | Time (hr) | Bending strength (kg/mm²) |
|---|---|---|---|---|---|---|
| 2 | $Si_3N_4$ 89.0 | $Y_2O_3$ 10.0 | $Al_2O_3$ 1.0 | 1600 | 1 | 34.5 |
| 3 | $Si_3N_4$ 85.0 | $Y_2O_3$ 10.0 | $Al_2O_3$ 5.0 | 1600 | 1 | 42.0 |
| 4 | $Si_3N_4$ 70.0 | $Y_2O_3$ 10.0 | $Al_2O_3$ 20.0 | 1600 | 1 | 48.5 |
| 5 | $Si_3N_4$ 90.0 | $Y_2O_3$ 5.0 | $Al_2O_3$ 5.0 | 1600 | 1 | 35.5 |
| 6 | $Si_3N_4$ 75.0 | $Y_2O_3$ 20.0 | $Al_2O_3$ 5.0 | 1600 | 1 | 43.8 |
| 7 | $Si_3N_4$ 85.0 | $La_2O_3$ 10.0 | $Al_2O_3$ 5.0 | 1500 | 1 | 36.5 |
| 8 | $Si_3N_4$ 85.0 | $Ce_2O_3$ 10.0 | $Al_2O_3$ 5.0 | 1600 | 1 | 42.1 |
| 9 | $Si_3N_4$ 85.0 | $Y_2(CO_3)_3$ 10.0 | $Al_2O_3$ 5.0 | 1600 | 1 | 45.5 |
| 10 | $Si_3N_4$ 85.0 | $Y_2O_3$ 10.0 | $Al_2O_3$ 5.0 | 1600 | 1 | 36.2 |
| 11 | $Si_3N_4$ 85.0 | $Sc_2O_3$ 5.0 / 5.0 | $Al_2O_3$ 5.0 | 1600 | 1 | 45.0 |

EXAMPLE 12

A mixture consisting of 88 parts of trisilicon tetranitride, 7 parts of yttrium oxide, 5 parts of aluminum oxide, the mean particle sizes thereof being 0.4, 1.6 and 1.3 microns respectively, and 5 parts of stearic acid as a binder was press-molded into small rods, the size thereof being 8 mm$\phi$ × 15 mm, at a pressure of 5000 kg/cm². These rods were gradually heated up to 400 °C during 4 hours to remove the binder by its own vaporization. Then they were filled into a carbon mold, 30 mm$\phi$ × 8 mm$\phi$ × 70 mm size, and hot-pressed at a pressure of 400 kg/cm² and a temperature of 1700 °C in nitrogen gas atmosphere for 30 minutes to obtain a sintered article. The obtained article was highly densified and had high bending strength of 105 kg/mm², and it was specifically strengthened in two dimensional directions parallel to the pressed surface thereof.

What we claim is:

1. A method of producing heat resistive, reinforced articles formed of composite materials substantially consisting of fibrous crystals of trisilicon tetranitride and a matrix of nonmetallic compound of Si-X-Al-O-N system, wherein X is an element selected from the group consisting of Y, Sc, La, Ce and mixtures thereof, which comprises:

providing a powdered mixture consisting essentially of 70 to 90 weight percent of trisilicon tetranitride, 1 to 20 weight percent aluminum oxide and 5 to 20 weight percent of an oxide material selected from the group consisting of yttrium oxide, scandium oxide, lanthanum oxide, cerium oxide and mixtures thereof, the particle size of said powdered mixture being in the range from about 0.1 to 2.0 microns;

press-molding said powdered mixture into a shaped article with the addition of about 5 weight percent of a temporary binder based upon the weight of the mixed raw materials; and subjecting the resultant shaped article in a non-oxidizing gas atmosphere to a further step of sintering at a temperature from about 1400 to 1900°C.

2. The method of claim 1 wherein said non-oxidizing gas is selected from the group consisting of nitrogen gas, ammonia gas, argon gas, mixed gas of nitrogen and hydrogen.

3. The method of claim 1 wherein said oxide material is yttrium oxide.

4. The method of claim 1 wherein said oxide material is cerium oxide.

5. The method of claim 3 wherein the yttrium oxide is substituted at least in part by yttrium carbonate.

6. The method of claim 3 wherein the yttrium oxide is substituted at least in part by yttrium hydroxide.

7. The method of claim 1 wherein the aluminum oxide is substituted at least in part by aluminum sulfate.

8. The method of claim 1 wherein said trisilicon tetranitride is substituted at least in part by silicon and said further step is conducted in a nitrogenous atmosphere selected from the group consisting of ammonium gas and a mixture of nitrogen and hydrogen.

9. A heat resistive, reinforced article formed of composite material which consists essentially of fibrous crystals of trisilicon tetranitride and a matrix of non-metallic compound of Si-X-Al-O-N system, wherein X is an element selected from the group consisting of Y, Sc, La, Ce, and mixtures thereof formed by the process of claim 1.

10. A method of producing heat resistive, reinforced articles formed of composite materials substantially consisting of fibrous crystals of trisilicon tetranitride and a matrix of nonmetallic compound of Si-X-Al-O-N system, wherein X is an element selected from the group consisting of Y, Sc, La, Ce and mixtures thereof, which comprises:

providing a powdered mixture consisting essentially of 70 to 90 weight percent of trisilicon tetranitride, 1 to 20 weight percent aluminum oxide and 5 to 20 weight percent of an oxide material selected from the group consisting of yttrium oxide, scandium oxide, lanthanum oxide, cerium oxide and mixtures thereof, the particle size of said powdered mixture being in the range from about 0.1 to 2.0 microns;

press-molding said powdered mixture into a shaped article with the addition of about 5 weight percent of a temporary binder based upon the weight of the mixed raw materials; and subjecting the resultant shaped article in a non-oxidizing gas atmosphere to a further step of hot pressing at a temperature from about 1400° to 1900°C.

11. The method of claim 10 wherein said non-oxidizing gas is selected from the group consisting of nitrogen gas, ammonia gas, argon gas, mixed gas of nitrogen and hydrogen.

12. The method of claim 10 wherein said oxide material is yttrium oxide.

13. The method of claim 10 therein said oxide material is cerium oxide.

14. The method of claim 12 therein the yttrium oxide is substituted at least in part by yttrium carbonate.

15. The method of claim 12 wherein the yttrium oxide is substituted at least in part by yttrium hydroxide.

16. The method of claim 10 wherein the aluminum oxide is substituted at least in part by aluminum sulfate.

17. The method of claim 10 therein said hot pressing is carried out at a pressure of about 400 kg/cm$^2$.

18. The method of claim 10 wherein said trisilicon tetranitride is substituted at least in part by silicon and said further step is conducted in a nitrogenous atmosphere selected from the group consisting of ammonium gas and a mixture of nitrogen and hydrogen.

19. A heat resistive, reinforced article formed of composite material which consists essentially of fibrous crystals of trisilicon tetranitride and a matrix of nonmetallic compound of Si-X-Al-O-N system, wherein X is an element selected from the group consisting of Y, Sc, La, Ce, and mixtures thereof formed by the process of claim 10.

* * * * *